United States Patent

Klaui

[15] 3,655,406

[45] Apr. 11, 1972

[54] CAROTENOID COMPOSITIONS

[72] Inventor: Heinrich Klaui, Riehen, Switzerland

[73] Assignee: Hoffmann-La Roche Inc., Nutley, N.J.

[22] Filed: Feb. 2, 1970

[21] Appl. No.: 8,004

[30] Foreign Application Priority Data

Feb. 7, 1969 Switzerland ............................ 1888/69

[52] U.S. Cl. ................................ 99/148 C, 99/139, 424/64, 424/69, 424/358
[51] Int. Cl. ............................................................. A23l 1/26
[58] Field of Search ........................ 99/148 C, 2 C; 252/316; 260/666 C; 106/137, 193, 209, 288

[56] References Cited

UNITED STATES PATENTS

| | | | |
|---|---|---|---|
| 3,316,101 | 4/1967 | Borenstein et al. | 99/148 C |
| 2,819,970 | 1/1958 | Steigmann | 99/130 |
| 2,916,385 | 12/1959 | Bauernfeind et al. | 99/148 C |

*Primary Examiner*—Raymond N. Jones
*Assistant Examiner*—J. M. Hunter
*Attorney*—Samuel L. Welt, Jon S. Saxe, Bernard S. Leon, Gerald S. Rosen and R. Hain Swope

[57] ABSTRACT

Carotenoid compositions dispersed in a hydrophilic, organic colloid such as gelatin which is distributed on the particles of a pulverulent carrier material such as starch which has a lipophilic surface.

12 Claims, No Drawings

CAROTENOID COMPOSITIONS

BACKGROUND OF THE INVENTION

There have been in the past numerous attempts to develop practical systems whereby the coloring power of carotenoids could be widely utilized in food, drug and cosmetic preparations. The desirability of using carotenoids as coloring agents lies in part in their intense color and in part to the fact that they are physiologically harmless. Because carotenoids are insoluble in water and have very limited solubility in fats, the prior uses of these substances have been mostly restricted to the coloring of fats such as, for example, butter and margarine. Carotenoids are quite adaptable to this use as they are quite color intensive in high dilution and such products require only a relatively small deepening of color. In contrast thereto, it has heretofore been impossible to utilize carotenoids in the coloring of products in which a high coloring action is necessary in thin layers, e.g. lipstick. This is so because the carotenoid fraction which will go into solution is too small to insure a sufficient coloring action in thin layer, and the crystallized carotenoid fraction not in solution has a color which often deviates strongly from that of the dissolved fraction. For example, a saturated canthaxanthin paraffin oil solution is colored orange in thick layer, while a canthaxanthin crystal suspension appears dark brown-violet. No serviceable coloring preparation is obtained even by a dilution of such a suspension.

It has now been found in accordance with the present invention that a carotenoid coloring preparation can be prepared which is suitable for the coloring of products such as described above. Specifically, and in accordance with the present invention, carotenoid preparations are prepared which are suitable for the coloring of products such as pharmaceuticals, food products and in particular cosmetics such as, for example, lipsticks.

BRIEF SUMMARY OF THE INVENTION

In accordance with the invention, a carotenoid substance is dispersed in a hydrophilic film-forming organic colloid which is in turn distributed on the particles of a pulverulent carrier material which is essentially insoluble in water and which has a lipophilic surface.

DETAILED DESCRIPTION OF THE INVENTION

In accordance with the present invention, a carotenoid substance or mixture of more than one carotenoid substance are finely dispersed in a solution of a hydrophilic, film-forming organic colloid. Such dispersions are well known in the art and can be manufactured by dispersing the carotenoid substance in an aqueous colloid solution, usually with the aid of an emulsifier. A common procedure comprises finely dispensing a carotenoid in a gelatin solution with the aid of a salt of a higher fatty acid ester of ascorbic acid, such as, for example, for sodium salt of ascorbyl palmitate. Other suitable colloids include, for example, dextrin, gum arabic, sugar esters of fatty acids, methylcellulose, polyvinylpyrrolidone and polyvinylalcohol. Other examples of suitable emulsifiers are the nonionic emulsifiers based on polyglycol and soaps such as, for example, sodium oleate, sodium stearate, and the like.

For the preparation of the dispersions of the colloid material, it is essential that said carotenoid be present in a very finely divided state, preferably having a particle size not in excess of 1 micron. It is especially preferred, however, that the particle size of the carotenoid substance be substantially small than 1 micron, for example, in the size range below 0.1 micron. As utilized herein, the term carotenoid coloring material may include one or a mixture of any number of the members of this recognized group of substances. The selection of individual members of the group is not limited and is governed fully by the purpose of use and the tint desired. For example, $\beta$-carotene and $\beta$-apo-8'-carotenic acid ($C_{30}$) ethyl ester are suitable for yellow and orange tints, whereas canthaxanthin, $\beta$-apo-8'-carotenal ($C_{30}$), echinenone, lycopene, citranaxanthin, torularhodinal-dehyde, torularhodin ethyl ester and spirilloxanthin, are suitable for red tints, and 2,2'-diketospirilloxanthin, decapreno-$\beta$-carotene and dodecapreno-$\beta$-carotene are suitable as bordeaux-red tints. These substances usually contain stabilizing amounts of the common antioxidant materials which are recognized for use therewith.

The dispersion of the carotenoid material is applied to the surface of the particles of a pulverulent carrier material which has a lipophilic surface and which is essentially insoluble in water. The particle size of the pulverulent carrier material is of a range of from about 1 micron to about 50 microns, and preferably of a range of between from about 5 microns to about 20 microns. The preferred pulverulent carrier materials are starch powders which have been treated to lipophilize their surface such as, for example, lipophilized rice, wheat and maize starches. Of these, lipophilized maize starch is particularly preferred. Such a starch is commercially available under the name DRYFLO. In addition to the lipophilized starches, microcrystalline cellulose may also be utilized as a carrier material.

The lipophilized surface of the pulverulent carrier material can be formed in situ by the addition of either an anion-active or a cation-active substance, or by a film-forming, polymeric, lipophilic material. Examples of anion-active substances include higher aliphatic fatty acids or derivatives thereof such as, for example, stearic acid, palmitic acid or palmitoylascorbic acid. These substances are especially preferred in the preparation of coloring compositions which are intended for use in food stuffs. Examples of cation-active substances include quaternary ammonium salts containing at least one lipophilic group which has a number of carbon atoms in excess of 12. Examples of such compounds include dimethyl-stearyl benzylammonium chloride, cetyltrimethylammonium bromide, cetyl-ethyl-dimethyl ammonium bromide and dodecyl-dimethyl-(2-phenoxy-ethyl) ammonium bromide.

Examples of the above mentioned film-forming, polymeric, lipophilic materials include those compounds obtained by the polymerization of siloxanes. Such compounds include, for example, the recognized siloxane compounds which are convertible into polysiloxanes such as, for example, alkyl siloxanes, particularly methyl siloxane, and aryl siloxanes, such as phenyl siloxane.

The final form as well as the specific method of manufacture of the coloring preparation in accordance with the present invention are determined by the specific utility anticipated for them. Thus, for example, the liquid or pasty pulp obtained after application to the carrier material of the fine dispersion of the carotenoid substance in the organic hydrophilic colloid may be used directly without being converted into a dry product. If it is desired to utilize the preparation as a dry product, the solvent contained therein is evaporated to dryness and the resultant material is comminuted to a fine powder to eliminate agglomerates which may form during the evaporation period. Where the coloring substances prepared in accordance with the present invention are to be dispersed into a fatty carrier or preparation, the aforementioned pulpy dispersion may be worked directly into the fatty carrier. If desired, the solvent can be partially removed prior to incorporation such as, for example, by passing the paste-like mass through a thin layer evaporator, usually under vacuum. The resultant products can be used for coloring fatty masses such as, for example, lipsticks. Suitable as fatty carrier materials for such preparations are all fats and oils which are solid or liquid at room temperature such as, for example, castor oil, lanolin, lanolin derivatives, waxes and the like.

It is also desirable to optionally include additives or adjunct materials in the coloring preparation prepared in accordance with the present invention. These adjunct materials include the following: pulverulent diluents such as, for example, microcrystalline cellulose, titanium dioxide, silicates and the like; preservatives such as ascorbic acid; stabilizing agents such as, for example, sulfites and ascorbates; and other additives such as, for example, perfumes and other aromatic substances. The coloring preparations prepared in accordance with the present invention have a very high coloring power and an especially good covering capacity. The use of such preparation is particularly indicated where a high relative reflective capacity of the dye employed is desired for a powerful coloring action. Accordingly, the preparations of the present invention can be employed wherever it is necessary or desired that a carotenoid be utilized as a pigment-dye. As examples there can be named: food stuffs such as, for example, tomato products in the form of juice, puree, soup, powder and the like; seasoning mixtures; farinaceous products; cake mixes and the like; pharmaceuticals such as tablets, dragees, capsules, granulates, suspensions, syrups and the like; cosmetic preparations such as lipsticks, powders of all types, creams and the like. These preparations can also be utilized for the coloring of plastic materials, packaging and wrapping materials and other industrial products. A particularly important field of use for the coloring preparations of this present invention is in those products wherein small amounts of dye which are not physiologically harmless had in the past been employed. By utilizing the coloring preparation of the present invention the concentration of such dyes may be substantially reduced or, in some cases, completely eliminated. This is particularly true in the case of lipsticks. The replacement of dyes conventionally used in lipsticks with the coloring preparations of the present invention has been found to eliminate in most cases a color shift toward blue on the skin usually associated with such dyes.

The following examples are given to illustrate the invention.

EXAMPLE 1

16.5 Parts by weight of canthaxanthin, 16.5 parts by weight of ascorbyl palmitate and 1.1 parts by weight of a $\alpha$-tocopherol were dissolved in 375.0 parts by weight of chloroform with heating. The solution thus obtained was emulsified into a solution consisting of 114.0 parts by weight of gelatin, 320.0 parts by weight of water and 1.65 parts by weight of sodium hydroxide. The emulsion was poured onto a metal sheet and dried in under vacuum at about 40°C. The water soluble dry preparation thus obtained contained about 10 percent by weight canthaxanthin.

One gram of the above dry preparation was dissolved in 9.0 ml. of water with heating and the resultant solution was well mixed with 9.0 g. of lipophilized maize starch until the starch was completely wetted. The resultant creamlike pulp was air dried and ground to a fine powder.

The coloring preparation thus obtained was ground on a roller machine with an equal amount of castor oil to form a color paste which was thereafter added to a conventional lipstick foundation formulation and processed into lipstick.

EXAMPLE 2

9.5 Grams of rice starch were thoroughly wetted with an aqueous solution of 0.5 g. dimethyl-stearyl-benzylammonium chloride. The treated starch was then air-dried.

A solution prepared by dissolving 1.0 g. of the water-soluble 10 percent canthaxanthin powder prepared in Example 1 in 9.0 ml. of water with heating to 45° C. was worked into the lipophilized starch until the latter was completely wetted. The pasty mass thus obtained was dried and ground to a moderately pale powder. A mixture of this powder with an equal amount of castor oil yields a paste possessing the same coloring power as the paste produced in Example 1.

The above fine powder product was added to a conventional face powder formulation thus yielding a flesh-tone face powder.

A powder was prepared as above utilizing 50.0 mg. of dimethyl-stearyl-ammonium chloride instead of the 0.5 g. utilized above. The resultant powder was similar to that obtained above, but less readily grindable.

EXAMPLE 3

8.5 Grams of rice starch were uniformly wetted with a solution of 0.5 g. of stearic acid in 10.0 ml. of diethyl ether and the solvent was evaporated.

The lipophilized starch thus obtained was uniformly wetted with an aqueous solution prepared by dissolving 1.0 g. of the water-soluble 10 percent canthaxanthin produced in Example 1 in 9.0 ml. of water with heating to 45°C.

The pasty mass thus obtained was spread on a metal sheet, dried and ground to a fine powder.

A pudding powder basic formulation was prepared by blending 10.0 g. of the coloring preparation thus prepared with 650.0 g. of maze starch, 100.0 g. of dried egg powder and 240.0 g. of sugar.

A powder was prepared as above utilizing 50.0 mg. of stearic acid instead of 0.5 g. to prepare the lipophilic starch. The powder thus obtained was less readily grindable than the powder produced utilizing 0.5 g. of stearic acid.

EXAMPLE 4

0.9 Grams of trans-$\beta$-carotene, 6.6 g. of cis-$\beta$-carotene, 16.5 g. of ascorbyl palmitate and 1.1 g. of $\alpha$-tocopherol were dissolved in 375.0 g. of chloroform with heating. The solution thereby obtained was thoroughly stirred with a solution of 110.0 g. of gelatin and 1.65 g. of sodium hydroxide in 250.0 g. of water. The chloroform was evaporated with stirring under reduced pressure and the residue dried under vacuum. The resulting mass was ground to a fine powder and 1.0 g. thereof was dissolved in 9.0 g. of water with heating to 50°C.

8.5 Grams of rice starch were uniformly wetted with a solution of 0.20 g. of palmitic acid, 0.05 g. of palmitoylascorbic acid and 0.25 g. of vanilla extract in 10.0 ml. of diethyl ether and 5.0 ml. of ethanol and the solvent was evaporated.

A basic formulation for pudding powders was obtained by combining the above powder and the carotene solution to form a pasty mass which was dried in a cold stream of air. The resulting dry mass was ground to a fine powder.

EXAMPLE 5

11.0 Parts by weight of $\beta$-apo-8'-carotenic acid ($C_{30}$) ethyl ester, 6.0 parts by weight of ascorbyl palmitate and 0.7 parts by weight of DL-$\alpha$-locopherol were dissolved in 200 parts by weight of chloroform with heating. The solution there by obtained was thoroughly emulsified into a solution of 55 parts by weight of gelatin, 20 parts by weight of saccharose and 1.1 parts by weight of sodium hydroxide in 200 parts by weight of water. The resultant emulsion was pured onto a metal sheet and dried under reduced pressure at about 40° C. The saler-soluble dry preparation thus obtained contained about 10 percent $\beta$-apo-8'-carotene acid ($C_{30}$) ethyl ester.

·10 parts by weight of the above dry preparation were dissolved in 90 parts by weight of water with heating and the resultant solution was well mixed with 90 parts by weight of lipophilized maize starch until the starch was completely wetted. The resultant creamlike pulp was air dried and ground to a fine yellow powder, which can be added e.g. to face powders.

EXAMPLE 6

A water soluble dry preparation was prepared as described in Example 5 utilizing $\beta$-apo-8'-carotenal (30) instead of $\beta$-apo-8'-carotenic acid ($C_{30}$) ethyl ester.

10 parts by weight of this preparation were dissolved in 110 parts by weight of water with heating. The solution thus obtained was well mixed with 140 parts by weight of cellulose powder. The mixture was then dried in an air stream. The resultant reddish-brown powder possesses in suitable dilution, a link similar to brown skin.

EXAMPLE 7

A coloring agent was prepared as described in Example 5 utilizing lycopin instead of β-apo-8'-carotenic acid ($C_{30}$) ethyl ester. The resultant coloring preparation is suitable for the preparation of lipstick foundation. A suspension of the coloring preparation in water shows a tomato color.

EXAMPLE 8

1.2 Parts by weight of echinenone, 1.6 parts of weight of ascorbyl palmitate and 0.1 parts by weight of DL-α-tocopherol were dissolved in 45 parts by weight chloroform with heating. The solution thus obtained was emulsified into a solution consisting of 80 parts by weight of gelatin, 15 parts by weight of saccharose and 0.5 parts by weight of sodium hydroxide in 250 parts by weight of water. The emulsion was poured onto a metal sheet and dried under reduced pressure at about 45°C.

1 Part by weight of the above dry preparation containing 1 percent echinenone was dissolved in 9 parts by weight water with heating and the resultant solution was mixed with 9 parts by weight of lipophilized maize starch. The resultant pulp was dried. The reddish powder shows a pastel color and is suitable as a component in face powders.

EXAMPLE 9

A coloring agent was prepared as described in Example 8 utilizing torularhodin ethyl ester instead of echinenone. The resulting rose-colored preparation possesses a pastel tint and can be added to face powders.

I claim:

1. A carotenoid composition comprising a water-insoluble pulverulent carrier material having a particle size range of from about 1 micron to about 50 microns and a lipophilic surface and a carotenoid layer consisting of a carotenoid having a particle size up to 1 micron dispersed in a hydrophilic, film-forming organic colloid, said carotenoid layer being distributed on the particles of said pulverulent carrier material.

2. A carotenoid composition in accordance with claim 1 wherein said pulverulent carrier material has a particle size in the range of from about 5 microns to about 20 microns.

3. A carotenoid composition in accordance with claim 1 wherein said water-insoluble pulverulent carrier material having a lipophilic surface is a starch selected from the group consisting of rice, wheat and maize starches.

4. A carotenoid composition in accordance with claim 1 wherein the surface of said water-insoluble pulverulent carrier material contains a lipophilic anion-active compound selected from the group consisting of stearic acid, palmitic acid and palmitoyl-ascorbic acid.

5. A carotenoid composition in accordance with claim 1 wherein the surface of said water-insoluble pulverulent carrier material contains a lipophilic cation-active compound selected from the group consisting of dimethyl-stearyl-benzylammonium chloride, cetyl-ethyl-dimethyl ammonium bromide and dodecyl-dimethyl-(2-phenoxyethyl)-ammonium bromide.

6. A carotenoid composition in accordance with claim 1 wherein the surface of said water-insoluble pulverulent carrier material contains a lipophilic film-forming polymeric material selected from the group consisting of polyalkylsiloxanes and polyarylsiloxanes.

7. A carotenoid composition in accordance with claim 1 wherein said carotenoid is selected from the group consisting of β-carotene, β-apo-8'-carotenic acid ($C_{30}$) ethyl ester, canthaxanthin, β-apo-8'-carotenal ($C_{30}$), echinenone, lycopene, citranaxanthin, torularhodinaldehyde, torularhodin ethyl ester, spirilloxanthin and 2,2'-diketospirilloxanthin.

8. A carotenoid composition in accordance with claim 1 wherein said hydrophilic, film-forming organic colloid is selected from the group consisting of gelatin, dextrin, gum arabic, sugar fatty acid esters, methylcellulose, polyvinyl alcohol and polyvinylpyrrolidone.

9. A carotenoid composition in accordance with claim 8 wherein said hydrophilic, film-forming organic colloid also contains an emulsifying agent.

10. A process for the preparation of a carotenoid composition which comprises applying to the surface of a water-insoluble pulverulent carrier material having a particle size range of from 1 micron to about 50 microns, a lipophilic surface a solution of a carotenoid material comprising a carotenoid having a particle size of less than one micron dispersed in a hydrophilic film-forming organic colloid material.

11. A process in accordance with claim 10 wherein the carotenoid composition is additionally dried to a solid mass and ground to a fine powder.

12. A process in accordance with claim 10 wherein said water-insoluble pulverulent carrier material having a lipophilic surface is a product formed by the treatment of a starch selected from the group consisting of rice, wheat and maize starches, with dimethyl-stearyl-benzyl-ammonium chloride, said hydrophilic, film-forming colloid is gelatin and said carotenoid is selected from the group consisting of β-carotene, β-apo-8'-carotenic acid ($C_{30}$) ethyl ester, canthaxanthin, β-apo-8'-carotenal ($C_{30}$), echinenone, lycopene, citranaxanthin, torularhodin aldehyde, torularhodin ethyl ester, spirilloxanthin and 2,2'-diketospirilloxanthin.

* * * * *